United States Patent [19]

Ootsu

[11] 4,289,425
[45] Sep. 15, 1981

[54] UNDERWATER ACCUMULATOR FOR PRESSURIZED GAS

[76] Inventor: Fumio Ootsu, 6-4, Shirahae-cho, Sasebo-shi, Nagasaki-ken, Japan, 857

[21] Appl. No.: 965,610

[22] Filed: Dec. 1, 1978

[30] Foreign Application Priority Data

Jun. 16, 1978 [JP] Japan .................................. 53/72903

[51] Int. Cl.³ .............................................. F17C 1/00
[52] U.S. Cl. .................................... 405/210; 114/257
[58] Field of Search ...................... 405/195, 210, 224; 114/256, 257

[56] References Cited

U.S. PATENT DOCUMENTS

| | | | |
|---|---|---|---|
| 1,220,825 | 3/1917 | Funga-Giera | 114/257 |
| 3,435,793 | 4/1969 | Shurtleff | 114/257 |
| 3,550,385 | 12/1970 | Lowd et al. | 405/224 X |
| 3,695,047 | 10/1972 | Pogonowski et al. | 405/210 |
| 3,828,565 | 8/1974 | McCabe | 405/210 X |
| 4,136,997 | 1/1979 | Chapman | 405/210 |

Primary Examiner—David H. Corbin
Attorney, Agent, or Firm—Blanchard, Flynn, Thiel, Boutell & Tanis

[57] ABSTRACT

An accumulator for storing pressurized air underwater comprises a reservoir anchored to the bottom of the sea or suspended underwater, and a pair of inlet and outlet passages for respectively supplying and discharging pressurized air into and out of the reservoir. The reservoir has an opening or openings through which water is flowable into and out of the reservoir. The anchored reservoir has a winch for winding or unwinding a chain connected to a weight, the winch being energizable when the water head at the reservoir changes so as to maintain pressurized air in the reservoir under constant pressure. The reservoir which is suspended has a plurality of floats that are inflatable or rigid with holes and are movable up and down as the water level in the reservoir varies so as to stabilize the air pressure in the reservoir.

9 Claims, 7 Drawing Figures

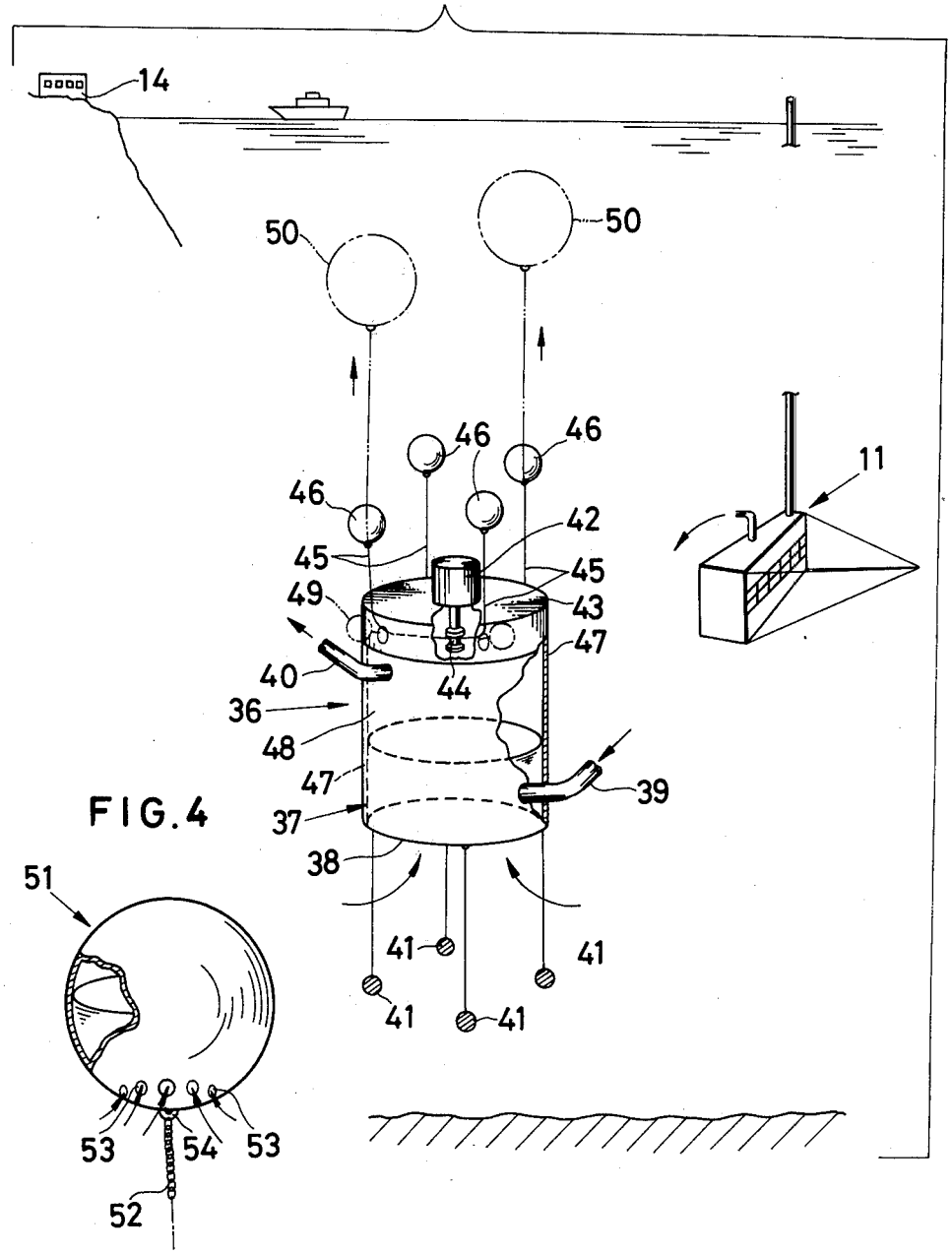

UNDERWATER ACCUMULATOR FOR PRESSURIZED GAS

FIELD OF THE INVENTION

The present invention relates to an apparatus for accumulating pressurized gas such as compressed air underwater so as to supply such gas therefrom under constant pressure.

BACKGROUND OF THE INVENTION

In an attempt to utilize the energy of tidal or nontidal ocean currents, I have invented a transducer apparatus (U.S. Pat. No. 4,071,305, patented on Jan. 31, 1978) which includes a mechanism for producing pressurized air in response to the rotation of an impeller driven by the flow of such ocean currents, the pressurized air being usable to operate a generator. One difficulty with such a transducer is that when the ocean current changes its direction or rate of flow, the rotation of the impeller is temporarily stopped or slowed down, causing the supply of the pressurized air to the generator to fail or become fluctuated. A solution to this problem would be to store the compressued air in an accumulator on the land, from which air under pressure can be supplied even when the impreller is disabled. Such conventional accumulators however, cannot produce constant air pressure since air pressure is governed by the amount of air which remains in the accumulator. Further, the accumulators must be structurally strong enough to withstand air pressure built up therein, and thus their manufacture is relatively complicated and costly.

SUMMARY OF THE INVENTION

According to the invention, an accumulator has a reservoir adapted to be placed underwater and provided with an opening, and has a pair of inlet and outlet passages connected to the reservoir for introducing and discharging pressurized gas respectively into and out of the reservoir, the gas being maintained under constant pressure at all times due to the water head at the reservoir. The reservoir is anchored in position by means of weights or is suspended underwater by means of floats that are positionally adjustable so as to maintain the reservoir substantially at a constant depth. The reservoir may be movable with respect to the weights so that it is vertically displaceable to compensate for changes in the water head.

An object of the present invention is to provide an accumulator for supplying gas under constant pressure regardless of the amount of gas remaining in the accumulator.

It is another object of the present invention to provide an underwater accumulator which is simple and rugged in structure, is light in weight, and can be installed underwater with relative ease.

Many other features and advantages of the present invention will become manifest to those versed in the art upon making reference to the detailed description and the accompanying sheets of drawings in which preferred structural embodiments incorporating the present invention are shown by way of illustrative example.

BRIEF DESCRIPTION OF THE DRAWINGS

FIG. 3 is a perspective view, with parts cut away, of an accumulator according to a second embodiment;

FIG. 4 is a perspective view, partly broken away, of a modified float which can be incorporated in the accumulator of FIG. 3;

DETAILED DESCRIPTION

Figure 1:
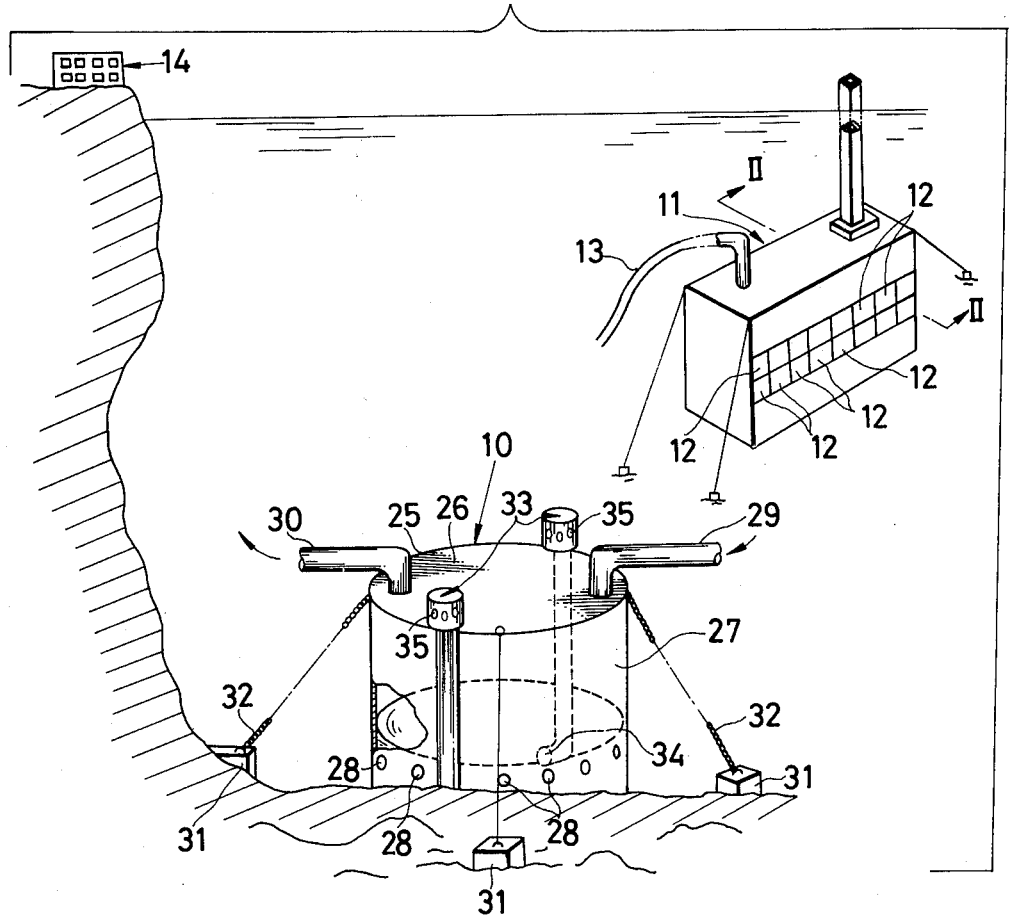
FIG. 1 is a perspective view, partly cut away, of an accumulator constructed in accordance with a first embodiment of the present invention.

The present invention is particularly useful when embodied in an accumulator such as is schematically shown in FIG. 1, generally indicated by the numeral 10.

A transducer assembly 11 contains a plurality of transducer units 12 for converting the energy of a tidal or nontidal ocean current to the energy of a high pressure fluid such as a pressured gas, such pressurized fluid being delivered through a conduit 13 to the accumulator 10, from which the pressurized fluid is supplied to a power generation plant 14 on the land.

Figure 2:
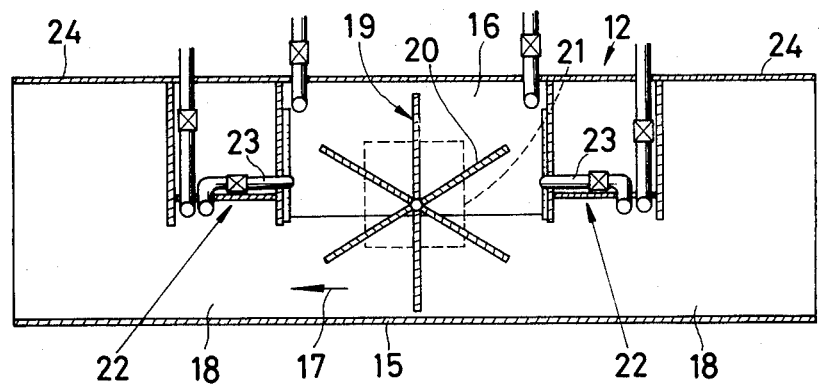
FIG. 2 is an enlarged cross-sectional view taken along line II—II of FIG. 1, showing a transducer unit contained in a transducer assembly.

The transducer assembly 11 is normally placed underwater and anchored to the bottom of the sea. As best shown in FIG. 2, each transducer unit 12 comprises a rectangular housing 15 including a plenum room 16 in which there is maintained an air pressure corresponding to the water head at a depth at which the unit 12 is disposed underwater, a water channel 17 underlying the plenum room 16 and having a pair of open ends 18, 18, an impeller 19 having a plurality of radial vanes 20 with its upper portion held in the plenum room 16 and its lower portion held in the water channel 17 at all times, and a converter mechanism 21 such as an air compressor operatively coupled with the shaft of the impeller 19. A pair of air-trapping chambers 22, 22 opening downwardly toward the water channel 17 are disposed one on each side of the plenum room 16 for receiving any air that may have escaped from the plenum room 16 through the water channel 17 when the transducer assembly 11 becomes tilted under stormy conditions. The trapped air received in the chambers 22, 22 can be restored to the plenum room 16 via a pair of valved pipes 23, 23. Mounted on the transducer unit 12 adjacent to the open ends 18, 18 of the channel 17 are a pair of guides 24, 24 for guiding water currents to flow into the water channel 17.

The power generation plant 14 contains one or more electric generators (not illustrated) utilizing the pressurized air supplied from the accumulator 10 as motive power for generating electricity, the plant 14 being mountable on a ship or anchorable to the bottom of the sea as desired.

The accumulator 10 includes a reservoir 25 in the form of a hollow cylinder made of a rigid material such as plastic or stainless steel, the reservoir being closed off at its upper end with a circular wall 26. The reservoir 25 has in its circumferential wall 27 a plurality of openings 28 located near its lower end circumferentially spaced apart from each other, water being flowable into and out of the reservoir 25 through the openings 28. A pair of inlet and outlet passages 29, 30 in the form of pipes communicate with the reservoir 25 through the upper wall 26, the inlet passage 29 being connected to the conduit 13 extending from the transducer assembly 11 for supplying the pressurized gas into the reservoir 25, the outlet passage 30 being connected to the power generation plant 14 for discharging the pressurized gas out of the reservoir 25 to the plant 14.

The reservoir 25 is anchored to the bottom of the sea by means of a plurality of weights 31 each connected to the reservoir 25 by a wire 32. The accumulator 10 further includes a pair of vertical water pipes 33, 33 mounted on and disposed diametrically opposite with respect to the reservoir 25, each pipe 33, 33 having a lower end 34 opening into the reservoir 25 at its lower end and an upper end 35 opening underwater near the upper wall 26 of the reservoir 25. The water pipes 33, 33 also allow water to flow into and out of the reservoir 25.

The accumulator 10 thus constructed operates as follows: Compressed air produced in the transducer assembly 11 is supplied through the conduit 13 and the inlet passage 29 into the accumulator reservoir 25. Continuing introduction of the air into the reservoir 25 causes water therein to be forced outwardly through the openings 28 and water pipes 33 into surrounding water, so that the level of water in the reservoir 25 will be depressed. When the pressurized air stored in the reservoir 25 is discharged through the outlet passage 30 to the power generation plant 14, water flows through the openings 28 and water pipes 33 into the reservoir 25 and the water level goes up in the reservoir 25. Otherwise stated, the air in the reservoir 25 is always held under a constant degree of pressure that corresponds to the water head at the depth at which the accumulator 10 is submerged underwater. For example, when the accumulator 10 is submerged at a depth of 50 m, the water head at such depth is approximately 6 kg/cm$^2$ (absolute pressure). Accordingly, the air pressure is not reduced or fluctuated within the reservoir 25, and the compressed air under constant pressure is supplied so stably from the reservoir 25 that it is suitable for use as a source of energy, as for generating electricity. Since the air pressure in the reservoir 25 corresponds to the water head at the depth where the accumulator 10 is submerged, the pressures acting on the inner and outer surfaces of the upper and circumferential walls 26, 27 of the reservoir 25 are equalized, and the reservoir 25 is free of any deformation or breakage due to undue forces that the reservoir 25 would otherwise undergo from the pressurized air it stores. The accumulator 10 thus constructed is particularly useful in an area of the sea where there are minimal variations of sea level.

FIG. 3 illustrates an accumulator 36 according to a second embodiment of the invention, the accumulator 36 being adapted to the bottom of the sea. The accumulator 36 is also suitable for use in an area of the sea where the sea level greatly varies due typically to tides. The accumulator 36 comprises a cylindrical reservoir 37 having an open bottom 38 through which sea water passes into and out of the reservoir 37. A pair of inlet and outlet passages 39, 40 permit pressurized air to flow from the transducer assembly 11 into the reservoir 37 and to be discharged from the reservoir 37 to the power generation plant 14. A plurality of weights 41 are hung from the bottom of the reservoir 37 to maintain an upright posture of the reservoir 37 underwater. The reservoir 37 includes means thereon for keeping itself substantially at a constant depth in the underwater, and such means comprises a winch 42 mounted on an upper wall 43 of the reservoir 37 and having a pulley 44, a plurality of wires 45 connected at one end with the pulley 44 for being wound around and unwound from the pulley 44 when the winch 42 is actuated, and a plurality of hollow floats 46 connected to the other ends of the wires 45, respectively. The floats 46 are made of expansible material such as rubber or synthetic resin and are filled with air under a predetermined degree of pressure. A pair of water level detectors 47 of a known structure are mounted on the inner surface of the cylindrical wall 48 of the reservoir 37, the detectors 47 being energizable to actuate the winch 42 when water in the reservoir 37 reaches predetermined levels.

When the amount of pressurized air in the reservoir 37 increases due to continuing influx of the air through the inlet passage 39, the reservoir 37 is liable to move up with an increased degree of buoyancy. At the same time, the water level in the reservoir 37 is lowered and arrives at a predetermined lower point, whereupon the detectors 47, 47 cause the winch 42 to wind up the wires 45 so as to bring the floats 46 downwardly to the position shown by the imaginary lines 49. With the floats 46 lowered, they shrink and their buoyancy becomes decreased, whereupon the overall buoyant force of the accumulator 36 becomes reduced. As the reservoir 37 is displaced downwardly by continuing discharge of the pressurized air through the outlet passage 40, the water level in the reservoir 37 is raised and reaches a predetermined upper point, whereupon the detectors 47, 47 are energized, thereby actuating the winch 42 to rotate its pulley 44 in the reverse direction. The wires 45 are then reeled out and the floats 46 are allowed to move upwardly to the position illustrated by the imaginary lines 50. As the floats 46 go up, they become inflated to produce an added degree of buoyancy, which compensates for a reduction of buoyancy of the reservoir that has resulted from consumption of the pressurized air. Accordingly, the accumulator 36 suspended underwater is automatically adjusted so as to be maintained at a constant depth even if the water level in the reservoir 37 is changed.

FIG. 4 illustrates a modified float 51 made of a rigid material such as plastic or steel, the float 51 being in the form of a hollow sphere connectable to the reservoir 37 shown in FIG. 3 through a chain 52. The float 51 has a plurality of holes 53 circularly arranged around a chain hook 54 on the float 51, water being flowable into and out of the float 51 through the holes 53. When in use, the float 51 contains therein a predetermined amount of air, which becomes compressed for a reduced degree of buoyancy when the float 51 is lowered and becomes expanded for an increased degree of buoyancy on moving up of the float 51. The float 51 is beneficial since it can withstand a relatively large degree of water pressure, is free of breakage due to fatique, and thus has a long service life.

Figure 5:
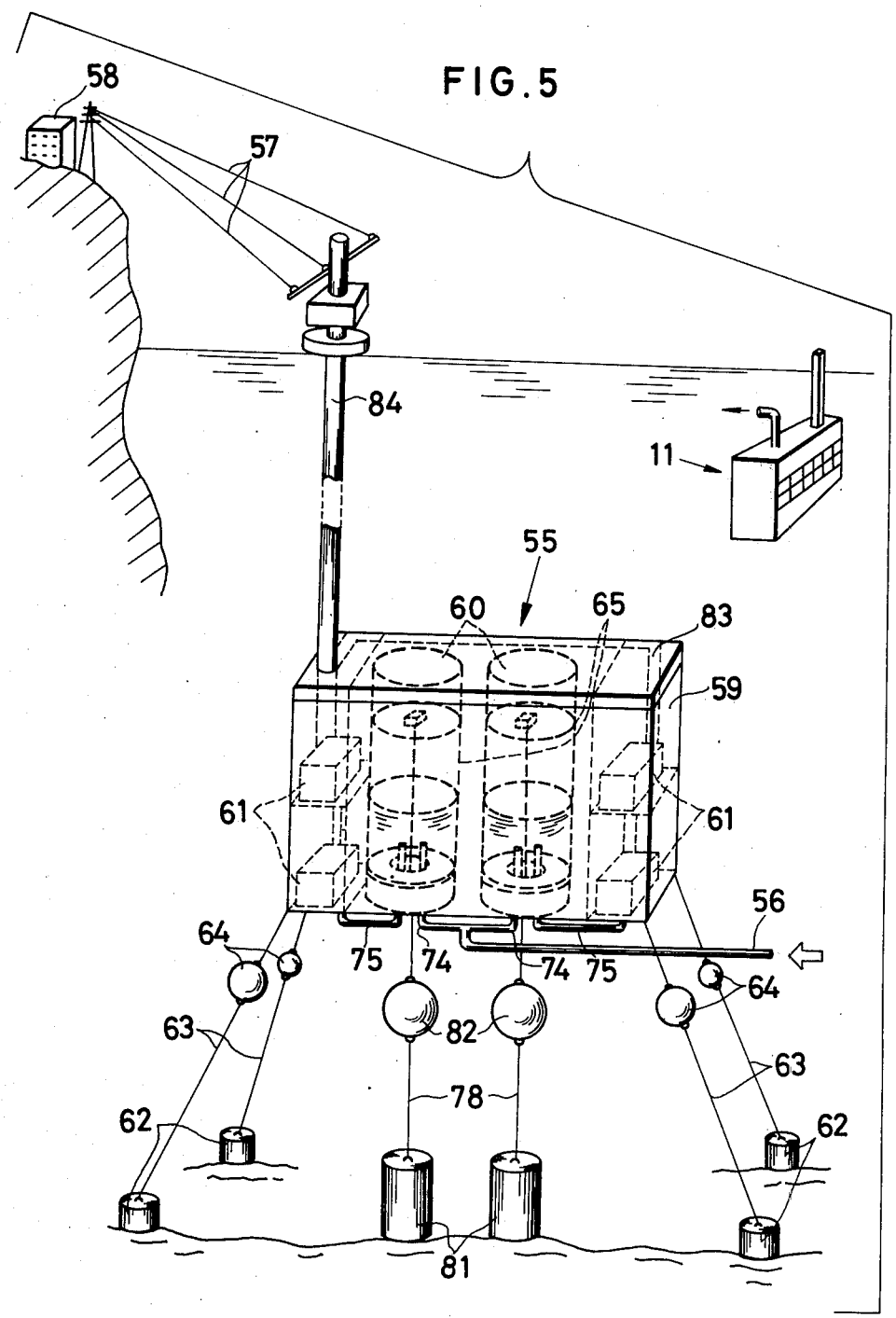
FIG. 5 is a perspective view of an accumulator assembly of a third embodiment.
Figure 6:
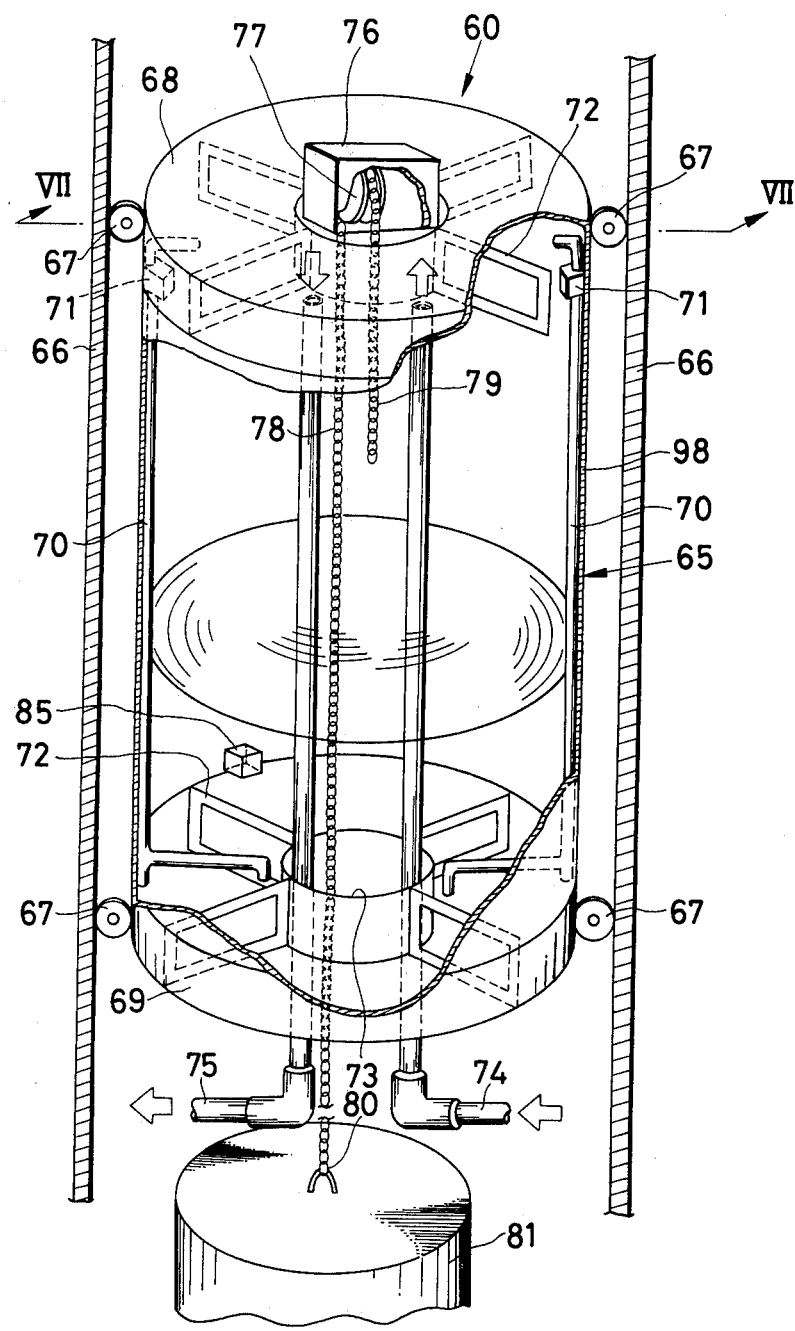
FIG. 6 is an enlarged perspective view, with parts broken away, of an accumulator in the accumulator assembly shown in FIG. 5.
Figure 7:
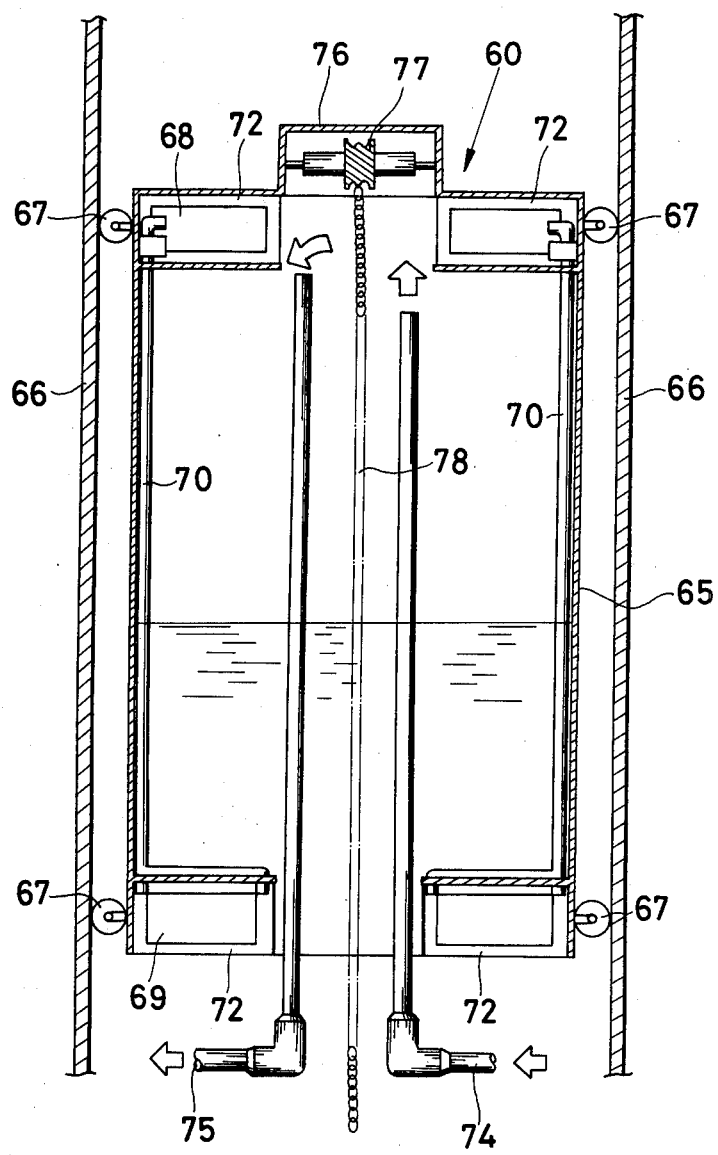
FIG. 7 is a cross-sectional view taken along line VII—VII of FIG. 6.

According to a third embodiment shown in FIGS. 5 through 7, a generator assembly 55 submerged in the sea receives pressurized air from the transducer assembly 11 through an air conduit 56 and generates electricity which is transmitted via transmission lines 57 to a substation 58 on the land. The generator assembly 55 basically comprises a housing 59, a pair of accumulators 60, 60 mounted in the housing 59 for storing the pressurized air supplied through the conduit 56, and a plurality of generator units 61 for converting the energy of the pressurized air from the accumulators 60, 60 into electricity, such generator units being of a known construction. The generator assembly 55 is anchored to the bottom of the sea by means of a plurality of weights 62 through wires 63 each having a float 64 in an intermediate position. As best shown in FIGS. 6 and 7, each accumulator 60 comprises a hollow cylindrical reservoir 65 vertically movable and supported in a sleeve 66 mounted in the housing 59 through a plurality of rollers 67 mounted on the cylindrical wall 98 of the reservoir 65 in rolling engagement with the sleeve 66. The reservoir 65 includes a pair of compartments 68, 69 located respectively at the upper and lower ends of the reservoir 65, the compartments 68, 69 being held in communication with each other by a pair of pipes 70, 70, respectively, each having a valve 71. The compartments 68, 69 are reinforced with a plurality of ribs 72.

The reservoir 65 has an opening 73 extending through the bottom end thereof, and a pair of air inlet and outlet passages 74, 75 extending through the opening 73 and into the interior of the reservoir 65, the passages 74, 75 having open ends disposed adjacent to the upper compartment 68. A winch 76 is mounted on the upper compartment 68, the winch 76 having a sprocket 77, around which extends in driven engagement a chain 78 having a free end 79 and the other end 80 connected to a weight 81 via a float 82 (FIG. 5).

In FIG. 5, the air conduit 56 is connected to the inlet passages 74, 74, and the outlet passages 75, 75 are connected to the generator units 61. The generator assembly 55 includes an air chamber 83 in its upper portion which gives the assembly 55 a suitable degree of buoyancy so as to stabilize the assembly 55 positionally. Extending upwardly from the assembly 55 is a duct 84 for discharging air consumed by and emitted from the generator units 61.

There is a water pressure sensor 85 in the reservoir 65 which, when the water head is varied, transmits signals for energizing the winch 76, such sensor 85 being of any conventional design for such purpose.

The energy of tidal or nontidal currents is converted by the transducer assembly 11 into pressurized air, which is fed through the conduit 56 and inlet passages 74 to the accumulators 60, 60 where the air is temporarily stored. The air is always maintained under constant pressure by the water head acting through the openings 73, 73 in the reservoirs 65. The compressed air is then supplied via the outlet passages 75, 75 to the generator units 61 for generating electricity. When the sea level is lowered due to an ebb tide, the water head acting on the accummulators 60, 60 becomes reduced, whereupon the air pressure in the reservoirs 65, 65 becomes also decreased. At this time, the sensor 85 detects such a reduction of water head and actuates the winch 76 to rotate in a direction to wind up the chain 78, with the result that the reservoir 65 moves downwardly and the air pressure therein is increased. With the sea level raised due to a flood tide, the air pressure in the reservoirs 65, 65 is increased by the water head increase, such a change in water head being detected by the sensor 85, which then actuates the winch 76 to unwind the chain 78. Thus, the reservoir 65 is raised to reduce the air pressure contained therein. The generator units 61 can thus be supplied with air under constant pressure.

The pressurized air that may have escaped downwardly through the opening 73 when the assembly 55 is tilted back and forth during stormy conditions is trapped in the lower compartment 69, from which such trapped air is sent to the upper compartment 68 via the valved pipes 70, 70.

Although various minor modifications might be made or suggested by those versed in the art, it should be understood that I wish to employ, within the scope of the patent warranted hereon, all such embodiments as reasonably and properly come within the scope of my contribution to the art.

I claim as my invention:

1. An apparatus for accumulating pressurized gas underwater comprising:
    a reservoir adapted to be placed underwater for storing pressurized gas, said reservoir having an opening through which water can flow into and out of the reservoir;
    an inlet passage and an outlet passage communicating with said reservoir for respectively supplying and discharging the pressurized gas to and from said reservoir;
    means cooperable with said reservoir for anchoring the reservoir underwater, comprising a winch mounted on said reservoir, a sprocket driven by said winch, a chain extending around said sprocket for being driven thereby upon actuation of said winch, a weight connected to said chain, means on said reservoir for operating said winch in response to variations in the water head at said reservoir;
    a housing adapted to be anchored underwater and a sleeve mounted in said housing, said reservoir being movably supported in said sleeve; and
    a plurality of rollers rotatably mounted on said reservoir, said rollers being in rolling engagement with said sleeve.

2. The apparatus according to claim 1, wherein said sleeve and said reservoir are cylindrical and have a common vertical axis, said reservoir being vertically movable in said sleeve, and said rollers are disposed at spaced circumferential intervals between said reservoir and said sleeve at the top and at the bottom of said reservoir.

3. The apparatus according to claim 2, wherein said opening is in the bottom of said reservoir and said inlet and outlet passages extend upwardly through said opening.

4. The apparatus according to claim 3, including a compartment surrounding said opening for trapping pressurized gas which escapes through said opening, and means for returning the trapped pressurized gas from said compartment to said reservoir.

5. The apparatus according to claim 3, wherein said winch and sprocket are mounted on the top of said reservoir, said chain extends vertically downwardly from said sprocket through said reservoir and said opening, and said weight is connected to the lower end of said chain.

6. The apparatus according to claim 5, wherein said means for operating said winch includes a water pressure sensor mounted inside said reservoir.

7. The apparatus according to claim 1, including means for anchoring said housing at a predetermined depth underwater and an air chamber in the upper portion of said housing for providing buoyancy to said housing.

8. The apparatus according to claim 1, including generator means in said housing communicating with said outlet passage for utilizing the pressurized gas in said reservoir to generate electricity.

9. The apparatus according to claim 8, including a discharge duct extending upwardly from said housing for conducting gases discharged by said generator means away from said generator means.

* * * * *